United States Patent
Bezinge et al.

(10) Patent No.: US 10,198,085 B2
(45) Date of Patent: Feb. 5, 2019

(54) METHOD AND CIRCUIT FOR SWITCHING A WRISTWATCH FROM A FIRST POWER MODE TO A SECOND POWER MODE

(71) Applicants: Slyde Watch SA, Luins (CH); Gaetan Bezinge, Saviese (CH); Alois Nathan Bezinge, Saviese (CH); Layane Bezinge, Saviese (CH); Leonard Basiien Bezinge, Saviese (CH)

(72) Inventors: Alex Bezinge, Saviese (CH); Adrian Mohni, St-Gallen (CH); Daniel Pfeifer, St. Anton Am Arlberg (AT); Musa Dogan, Heerbrugg (CH)

(73) Assignee: Slyde Watch SA (CH)

( * ) Notice: Subject to any disclaimer, the term of this patent is extended or adjusted under 35 U.S.C. 154(b) by 0 days.

(21) Appl. No.: 15/799,608

(22) Filed: Oct. 31, 2017

(65) Prior Publication Data
US 2018/0067563 A1    Mar. 8, 2018

Related U.S. Application Data (63) Continuation of application No. 14/352,727, filed as application No. PCT/EP2012/070273 on Oct. 12, 2012, now Pat. No. 9,804,678.

(30) Foreign Application Priority Data

Oct. 18, 2011    (CH) ..................... 1689/11

(51) Int. Cl.
*G06F 1/32*    (2006.01)
*G06F 3/01*    (2006.01)
(Continued)

(52) U.S. Cl.
CPC ............ *G06F 3/017* (2013.01); *G04C 3/002* (2013.01); *G04G 17/045* (2013.01); *G04G 19/12* (2013.01);
(Continued)

(58) Field of Classification Search
CPC ...... G04C 3/002; G04G 17/045; G04G 19/12; G04G 21/08; G06F 1/3203; G06F 3/017;
(Continued)

(56) References Cited

U.S. PATENT DOCUMENTS 8,230,246 B1    7/2012   Sharkey
2002/0118605 A1    8/2002   Born et al.
(Continued)

FOREIGN PATENT DOCUMENTS

EP    1324159 A1    7/2003
EP    1785808 A1    5/2007
(Continued)

OTHER PUBLICATIONS

K. Tuck et al., "MMA84500Q Single/Double and Directional Tap Detection", Freescale Semiconductor, Inc., 2010; 16 pages.
(Continued)

*Primary Examiner* — Hong Zhou
(74) *Attorney, Agent, or Firm* — Blank Rome LLP (57) ABSTRACT

An electronic wristwatch operable in two power modes. The wristwatch has an inertial sensor for detecting a gesture on a cover glass of the wristwatch. A touch panel is provided underneath the cover glass for detecting the gesture. Gesture detection by the inertial sensor is combined with gesture detection by the touch panel for triggering a switch from a first power mode to a second power mode.

10 Claims, 5 Drawing Sheets

(51) Int. Cl.
  *G06F 3/041* (2006.01)
  *G04G 17/04* (2006.01)
  *G04G 19/12* (2006.01)
  *G04G 21/08* (2010.01)
  *G04C 3/00* (2006.01)

(52) U.S. Cl.
  CPC ............ *G04G 21/08* (2013.01); *G06F 1/3203* (2013.01); *G06F 3/041* (2013.01)

(58) Field of Classification Search
  CPC ...... G06F 3/041; G06F 1/3218; G06F 1/3265; G06F 1/163; G06F 3/0346
  See application file for complete search history.

(56) References Cited

U.S. PATENT DOCUMENTS

| | | |
|---|---|---|
| 2002/0167699 A1 | 11/2002 | Verplaetse et al. |
| 2004/0179431 A1* | 9/2004 | Nakajima ............... G04G 21/02 368/11 |
| 2006/0256081 A1 | 11/2006 | Zalewski |
| 2007/0176896 A1 | 8/2007 | Gritton et al. |
| 2008/0229255 A1 | 9/2008 | Linjama |
| 2009/0085865 A1 | 4/2009 | Fattah |
| 2009/0102669 A1 | 4/2009 | Lin |
| 2009/0195497 A1 | 8/2009 | Fitzgerald |
| 2009/0199130 A1 | 8/2009 | Tsern et al. |
| 2010/0231777 A1 | 9/2010 | Shintani |
| 2010/0235667 A1 | 9/2010 | Mucignat et al. |
| 2010/0265209 A1 | 10/2010 | Nurmi et al. |
| 2011/0080349 A1 | 4/2011 | Holbein et al. |
| 2011/0109540 A1 | 5/2011 | Milne et al. |
| 2011/0164057 A1* | 7/2011 | Prabhu ................... G06F 3/017 345/650 |
| 2011/0264928 A1 | 10/2011 | Hinckley |
| 2012/0062470 A1 | 3/2012 | Chang |
| 2012/0092383 A1 | 4/2012 | Hysek et al. |
| 2012/0154303 A1 | 6/2012 | Lazaridis et al. |

FOREIGN PATENT DOCUMENTS

| | | |
|---|---|---|
| EP | 2315101 A1 | 4/2011 |
| WO | WO-09120292 A2 | 10/2009 |
| WO | WO-11000893 A1 | 1/2011 |

OTHER PUBLICATIONS

BMA180 Digital, "Triaxial Acceleration Sensor", Data Sheet, Bosch Sensortec, Dec. 10, 2009, pp. 1-69.

* cited by examiner

METHOD AND CIRCUIT FOR SWITCHING A WRISTWATCH FROM A FIRST POWER MODE TO A SECOND POWER MODE

The present application is a continuation of U.S. patent application Ser. No. 14/352,727, filed Apr. 18, 2014, which is a national phase application of PCT/EP2012/070273, filed Oct. 12, 2012, which claims priority to Swiss Patent Application No. CH2011/1689, filed Oct. 18, 2011. The entire contents of those applications are hereby incorporated by reference.

FIELD OF THE INVENTION

The present invention is related to a method for switching a wristwatch from a first power mode to a second power mode, and to a wristwatch which can be switched from a first power mode to a second power mode. The present invention is also related to wristwatches with a touch panel and a plurality of power modes.

DESCRIPTION OF RELATED ART

EP1324159 concerns a wristwatch having a touch panel. When not used, a display is switched to a sleeping mode. To avoid an accidental activation of the sensors, a press button is provided to activate the sensors and the liquid crystal display.

US2009199130 concerns a method and apparatus for receiving an input by a user on an interactive touchscreen display. The input comprises a contact gesture detected with accelerometers.

US2002118605 discloses a tactile wristwatch in which touch-sensitive keyboard keys are switched on when a user presses a touch-sensitive keyboard.

US2009102669 discloses an alarm clock that can be stopped by the hand of a user approaching a proximity sensor.

WO09120292 concerns mobile handheld devices such as, for example, cell phones or personal digital assistants (PDAs) containing an accelerometer that sends a signal that causes the device to turn on.

WO11000893 describes a wristwatch with a touch display. The wristwatch comprises an accelerometer which is used for simulating effects of shocks or acceleration on the movement. In order to reduce the power consumption, the display is automatically switched into a sleeping mode when not used. The user can wake up the display by means of a slight pressure of the glass or with a single tap or a double tap on the touch panel. This document does not describe how taps or double taps are detected and distinguished from other gestures or manipulations of the watch.

US2010/235667 describes a device with an accelerometer for detecting gestures used to wake up the device.

EP2315101 describes a method combining use of an inertial sensor and of a touch panel for detecting taps on the touch panel of a device such as a smartphone. The detection of taps by the touch panel is mainly based on the amplitude of the acceleration signal; if this amplitude is higher than a threshold, then the touch panel will be woken up to confirm this detection. Although this process might work well in smartphones, it has been found that a more precise detection method would be needed for wristwatches. Indeed, wristwatches are often subject to high acceleration values, sometimes in the magnitude of 50 G or higher, in normal use or during sport. The inertial system described in this document is not able to distinguish reliably between those high acceleration values in normal use and acceleration due to a tap or other gesture. This results in numerous undesirable activation of the touch panel and therefore in a decrease of the power reserve. Moreover, the user is requested to exert a strong pressure on the display in order to produce an acceleration above the detection threshold.

A similar solution is described in EP1785808.

Therefore, different methods are known in order to switch on a device in sleep mode. However, it is difficult to distinguish between intentional commands to switch a device and other gestures or accelerations which may be produced during normal use of the device. For example, undesired switch of operating mode could occur when the touch display touches a piece of cloth or in case of strong acceleration value, for example during sport.

BRIEF SUMMARY OF THE INVENTION

It is therefore an aim of the invention to provide a better method for switching a device, such as a microelectronic device, into a different power mode.

It is another aim of the invention to provide a method for faster switching of a device into a different power mode, without causing unwanted power mode switches.

It is another aim to provide a method for switching a device into a different power mode which avoids undesired change of mode.

According to the invention, these aims are achieved by means of a method for switching a device from a first power mode to a second power mode, comprising:

using an accelerometer (as example of inertial sensor) with embedded signal processing capabilities for generating an acceleration signal used for detecting a gesture on a cover glass of said wristwatch;

using a touch panel underneath said cover glass for detecting said gesture;

combining gesture detection by the inertial sensor and gesture detection with the touch panel for triggering a switch from said first power mode to said second power mode, said method comprising a step of discriminating between gesture and no gesture based on the frequency of said acceleration signal, and/or the direction of said acceleration signal as measured by said accelerometer being a three dimensional accelerometer, and/or the slope of said acceleration signal.

The gesture entered by the user to switch the power mode could be a tap, a double tap, a long tap or any other significant and recognizable gesture rarely occurring outside of normal use of the device, and which do not need important processing capabilities to be recognized.

The simultaneous and combinatory usage of an inertial sensor, such as an accelerometer, and of a touch sensor or touch panel for detecting a gesture provides a more reliable discrimination between various gestures and other manipulations. Moreover, this solution reduces the power consumption in the first power mode since only the inertial sensor needs to be switched on in this mode.

The discrimination based on the frequency, and/or the slope of the acceleration signal is much more robust than a discrimination based on the amplitude of the acceleration signal only. It has been found that taps produce an acceleration signal in a specific relatively narrow frequency range. It has also been found that the slope of this acceleration signal, during increase and subsequent decrease, is in a specific range. Therefore, the frequency and/or the slope of the acceleration signal can both be used, alone or in combination, as a signature of an acceleration produced by taps, or by other gestures one wants to detect, allowing thus to distinguish between an acceleration caused by a tap from most other causes of acceleration.

It has been found that the acceleration caused by a tap comprises a significant component along a direction substantially perpendicular to the surface of the glass on which the tap is made, whereas most other causes produce accelerations along other directions. Therefore, a measure of the direction of the acceleration relatively to the surface of the glass could be used for distinguishing taps.

This discrimination based on the direction is even more reliable if the user is requested to make a tap on a predefined limited portion of the glass. In this case, detection of the direction of the tap is easier, especially if the glass is curved.

The first power mode could be a sleep mode, or standby mode, in which the power consumption is reduced but no indications are displayed on the display. The second power mode could be an operating mode where indications are displayed on the display.

BRIEF DESCRIPTION OF THE DRAWINGS

The invention will be better understood with the aid of the description of an embodiment given by way of example and illustrated by the figures, in which:

FIG. 1b illustrates a transversal cut through the wristwatch of FIG. 1a.

DETAILED DESCRIPTION OF POSSIBLE EMBODIMENTS OF THE INVENTION

Figure 1A:
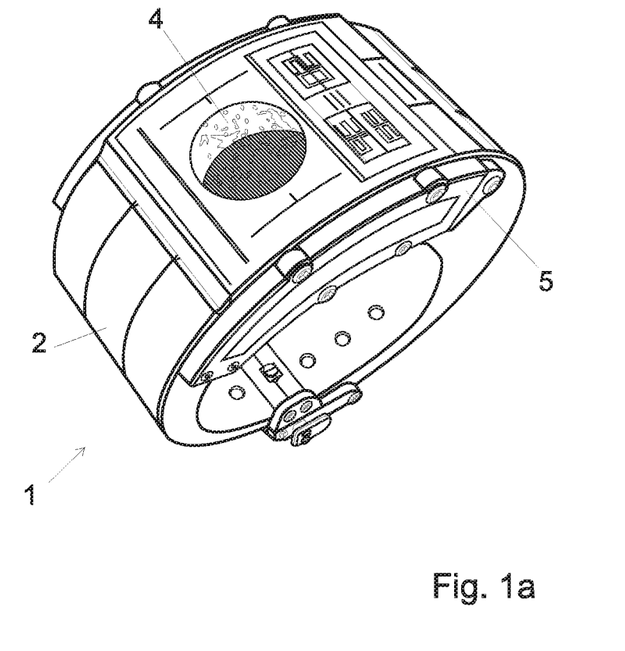
FIG. 1a illustrates a perspective view of a buttonless wristwatch with a touch display according to the invention.
Figure 1B:
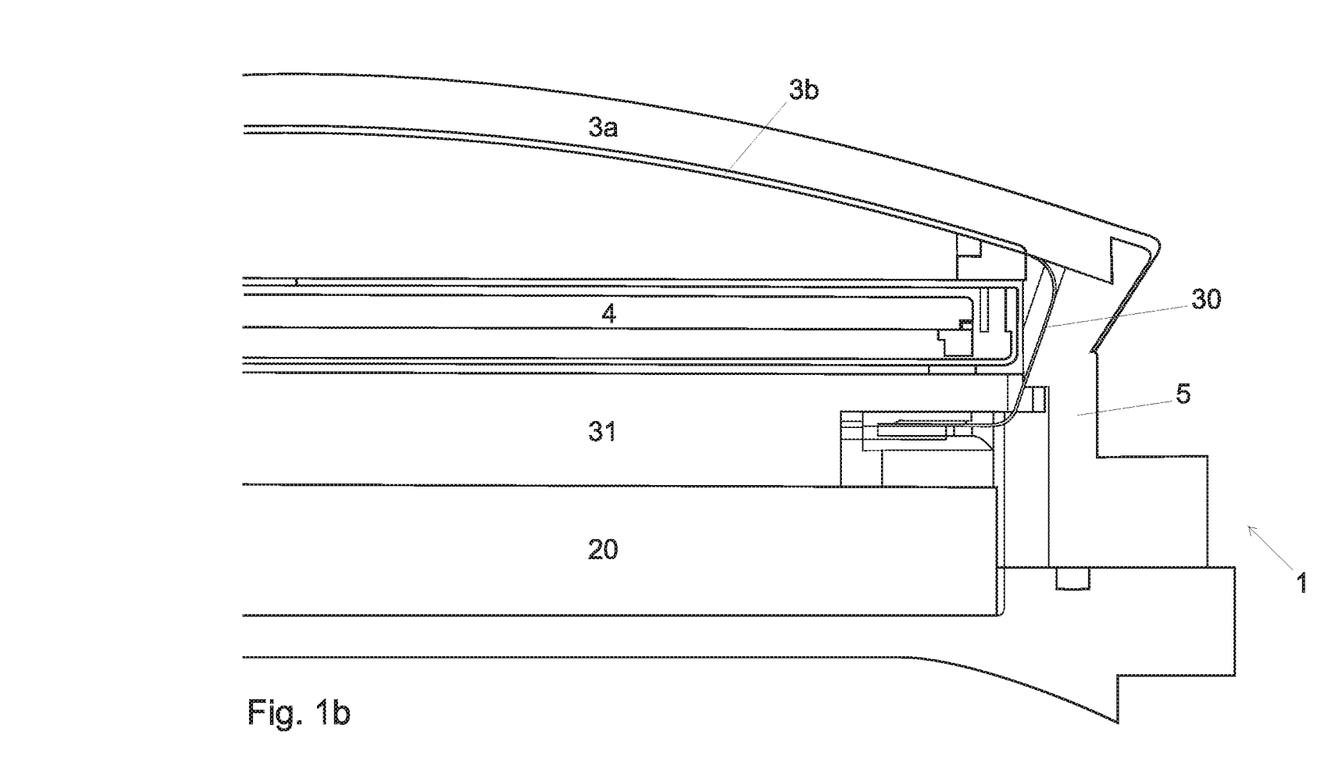

FIGS. 1a and 1b illustrate an example of a wristwatch 1 according to the invention. The illustrated watch comprises notably a wristband 2 and a watch case 5 closed with a glass 3a and a touch sensor 3b covering a digital matrix display 4.

In a preferred embodiment, the watch has no crown and no push-buttons and is operated only through the touch panels and additional sensors, such as inertial sensors, inside the watch case. The water-tightness and solidity of the case is thus improved.

A luminosity sensor enabling the intensity of the screen to be automatically adapted to the surrounding luminosity can also be used as an option. The watch can switch nearly instantly from a stand-by mode, where the display is switched off or at least less luminous, to a "time reading" and/or navigation mode, for example as soon as the glass is touched or following a tap or double tap on the glass.

The watch case 5 can also include a connector (not shown) to connect the watch to an external computer, for example a micro or nano USB connector on the bottom or in one of the watch's sides. Wireless connection means, for example a ZigBee or Bluetooth module, can also be provided for connecting the watch to a personal computer and/or for supplying power to the watch and load the battery.

The watch is advantageously powered electrically by means of a rechargeable accumulator 20 (FIG. 1b) through the micro or nano USB connector, through a specific or proprietary connector or, in a variant embodiment, through a radiofrequency interface.

The glass 3a with the touch sensor 3b underneath closes the upper surface of the watch case and covers the digital matrix display 4; there is an air gap between the touch sensor 3b and the display. The glass is preferably made of sapphire or of another scratchproof material and is coated with an anti-glare treatment. In a preferred embodiment, the glass is cylindrically, or possibly spherically curved, while the display 4 is preferably flat.

The display 4 is preferably a high-resolution digital matrix display, and fills up nearly the entire surface under the glass 3a and thus serves both as multipurpose multi-function display and as time indicator. In a preferred embodiment, the display is a color liquid crystal display (LCD) or color thin film transistor display (TFT) with at least 150×150 pixels or more than 200 dpi (dot per inch). Other types of display, including displays based on the AMOLED technology for example, can also be used. Furthermore, the watch could also have several displays, for example several digital displays, or a digital matrix display combined with hands or other mechanical indicators.

The display 4 is preferably placed on a printed circuit board 31 on which other components, such as a microcontroller, an inertial sensor etc are also mounted. A connector 30 connects the touch sensor 3b with the printed circuit board 31; in one preferred embodiment, this connector is detachable, so that the glass 3a can be replaced independently of the printed circuit board. In the illustrated embodiment, the printed circuit board 31 rests directly against the watch case 5, so that accelerations on the glass 3a are transmitted to the inertial sensor on the board 31 with minimal damping.

The touch sensor or touch panel 3b is laminated or deposited underneath the glass 3a. In the following, since those two components are integrated, we will use interchangeably the expression glass or touch panel or touch sensor for designating the same component, depending on the context. A touch panel integrated between the display 4 and the glass cover 3a could also be used in a sandwich configuration with a flat glass cover 3a.

The touch panel 3b has an array of transparent electrodes and is placed underneath the glass 3a in order to detect the presence of a finger or of a stylus. The detection technology preferably uses methods known in the state of the art, for example a capacitive detection, for detecting finger contact and various gestures on one or several of the electrodes. In one embodiment, transparent electrodes can be individually powered in order to put the touch panel in a low power mode with only some electrodes, for example electrodes in the middle, which are powered on and can detect finger contact on the corresponding part of the display; the remaining electrodes are not powered on in this low power mode.

The display 4 can display various indications, for example the current time, date, chrono, reverse counter, calendar, etc . . . or phases of the moon as shown in FIG. 1. In order to extend the watch's functionalities, the user can switch from one display mode to another and for example replace the card displayed in FIG. 1 with other cards. In a preferred embodiment, the user can move from one card to the other with a slide (fast) or scroll (slow) gesture for moving through and viewing a collection of available displays or cards. Scrolling or sliding in the horizontal or vertical direction is achieved by moving the finger on the glass in the corresponding direction.

Figure 2:
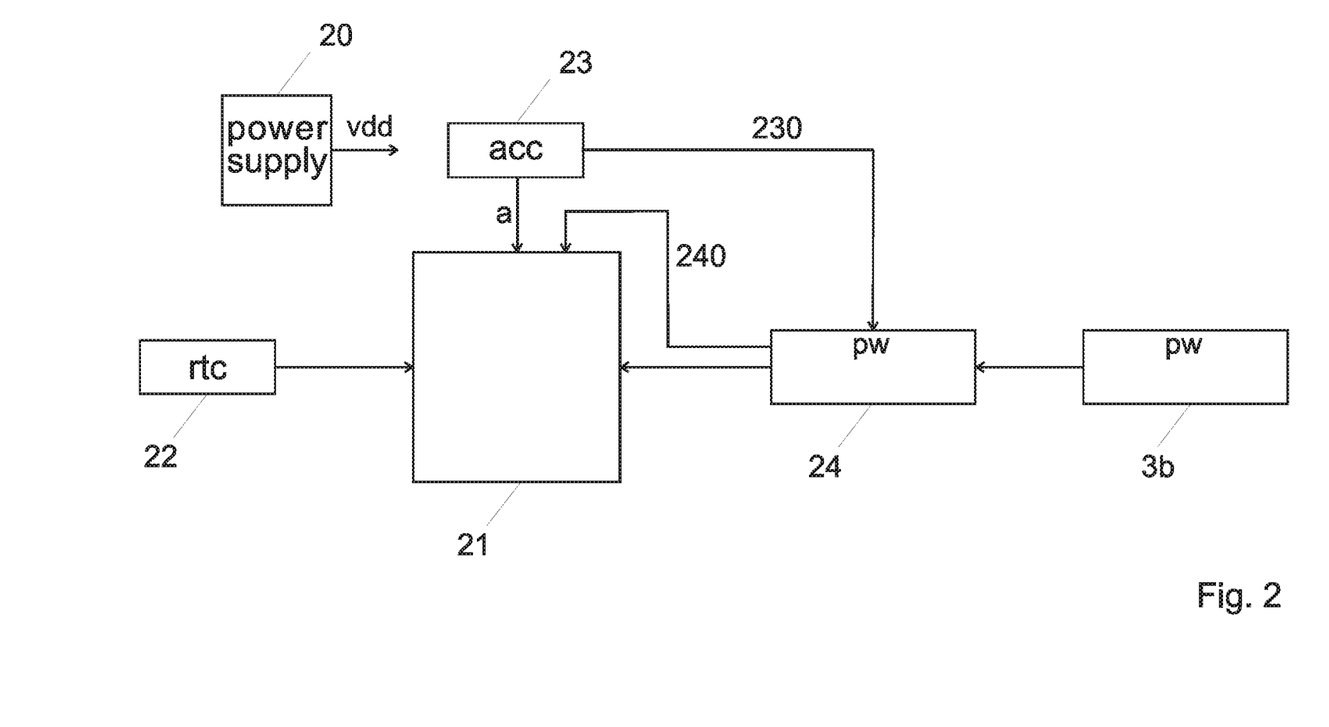
FIG. 2 schematically illustrates a possible arrangement of some components within an embodiment of wristwatch.

FIG. 2 schematically illustrates a possible arrangement and schematic of some components within an embodiment of wristwatch according to the invention. Only components which are necessary for the understanding of the invention have been represented, although other components and other arrangements could be provided in other embodiments of the invention.

The illustrated arrangement comprises a power supply 20, such as a rechargeable battery, for supplying power to all other components. A microcontroller 21 controls the display of indications on the matrix panel 4, depending on signals provided by the sensors 22, 23 and on commands entered by the user through the touch panel 4.

The component 22 is a real-time clock for generating a clock signal based on a quartz (not shown).

The sensor 23 is an inertial sensor, preferably an accelerometer, preferably a 3-axis mems-based accelerometer for measuring acceleration values a (FIG. 4) in a direction perpendicular to center of the glass of the wristwatch and in two orthogonal directions in a plane tangential to this glass at his center. This inertial sensor can comprise signal processing capabilities embedded within the same component or chip, for determining the frequency of the measured acceleration signal, the direction of this signal in 2 or 3 directions, the duration of an event in the acceleration signal, etc.

The component 24 is a touch panel controller (touch controller) for interpreting touch signals provided by the touch panel 3b when the user touches the glass 3a with his finger and consequently generate signals in the touch panel 3b located underneath, and for converting those signals into command signals for the microcontroller 21.

Other components, such as an input-output circuit, for example a USB decoder or a Bluetooth or ZigBee receiver, can also be integrated.

The microcontroller 21 is specifically configured to interpret the signals from the touch controller 24 and from the inertial sensor 23, to select indications from several available indications depending on these signals, and to display those indications on the digital matrix display 4; this arrangement is preferably achieved by storing in the microcontroller's memory a computer program (firmware) allowing this specific sequence of operation to be fully controlled.

At least some of the components 21 to 24 and 3b and 4 can be powered in at least two different modes. In one preferred embodiment, a power saving mode and a time display mode are provided; the whole wristwatch can thus be powered either in time display mode for displaying time or other indications on the display 4, or in power saving mode for preserving the battery 20 by switching the display 4, the touch sensor 3b and other components in a low consumption mode. In one preferred embodiment, the display 4 and the touch sensor 3b are switched off in low power saving mode.

In some embodiments, more than two power modes can be provided; for example, the real time clock 22 is preferably always powered on in power saving mode, so that the real time is not lost when the display 4 and the touch panel 3b are switched off; it is possible however to switch the real time clock off in a deep sleep mode in order to prevent the battery from being totally discharged. Other components, such as the microcontroller 21, the touch panel 3b etc could have more than two different power modes, for example a hot power saving mode allowing for a very fast re-start, and a cold power saving mode in which restart is possibly slower or necessitates restarting an operating system.

The device 1 can be switched from a first power mode, such as a power saving mode, to a second power mode, such as a time display mode, with a user gesture on the glass 3a/touch panel 3b. The device 1 can automatically return to the first power mode, for example after a predetermined duration, or when no acceleration and/or no activity are detected.

In one embodiment, a gesture command to switch the device into a second power mode is detected with the inertial sensor 23 for detecting a tap, a double tap or another command which can be input by the user onto the glass 3a/touch panel 3b in order to trigger a change of power mode. The inertial sensor 23 could be an accelerometer with embedded power processing capabilities and which is always powered on in the first low power mode. The embedded power processing capabilities comprise a processor or other processing means for executing programmable software code for analysing the accelerations values delivered by the accelerometer, and for generating signals or values when certain conditions are met.

In order to avoid undesired switches to the second power mode, which would switch the display on and reduce the operating time of the battery, it is necessary to discriminate between changes in the acceleration signals which are caused by a switch on gesture, such as a tap or a double tap, and any other acceleration caused when the wristwatch is displaced or manipulated in normal use. In one preferred embodiment, the accelerometer 23 generates a power on signal 230 for powering the touch panel 3b and the touch controller 24 when the user enters a tap gesture on the glass 3a/touch panel 3b, which can be discriminated from other signals with the following properties:

frequency: tap signals are typically high frequency signals and can be distinguished from other signals produced by slide, rub etc and from most acceleration that occur during normal use of the wristwatch. The acceleration produced by a valid single tap is a pulse function with a first step of fast increase of the acceleration almost immediately followed by a step of fast deceleration, the duration of the whole pulse being typically in the range of 10 to 20 ms. Therefore, the bandwidth of this pulse-like function is necessarily higher than a pre-defined threshold, and a low pass filtering of acceleration signals can be used to cancel signals produced by gestures other than taps or by movements of the wrist. Preferably, the embedded processing capabilities of the accelerometer exclude the possibility of the tap if the frequency of the acceleration signal, in a given direction such as the direction perpendicular to the center of the glass, is not in a predefined range.

duration of the pulse: as indicated, a valid single tap generates a pulse with a duration within a given range, usually between 5 and 100 ms, typically between 10 and 20 ms.

amplitude of the pulse: a valid single tap is detected only if the amplitude of the acceleration is higher than a first predefined threshold $a_{tap\_thresh}$. End of the tap is detected when the amplitude decreases below a second threshold $a_{notap\_thresh}$.

direction of the acceleration: a tap on the glass generates a maximal acceleration in a main direction perpendicular to the center of the glass, oriented toward the bottom of the watch, and a much lower acceleration in all other directions. A 3D accelerometer can be used for discriminating valid taps based on the direction of the acceleration. For example, if the acceleration in a direction other than the main direction is higher than the acceleration in the main direction, the gesture will not be recognized as a switch on tap.

slope of the acceleration: this feature can also be used to differentiate between a valid switch on tap and a non valid one. Taps typically generate a fast increase of the acceleration, whereas most other gestures such as swipes etc and most movements of the wrist produce a slower acceleration increase. Therefore, the system could distinguish that a tap is not valid if the slope of the acceleration is not in an expected range. It is also possible to measure the slope of acceleration in one preferential direction, for example in a direction perpendicular to the center of the glass, or separately in a plurality of predefined directions.

The slope may be defined by the difference between two predefined acceleration values divided by the time it takes for the acceleration signal to goes from the first of those predefined values to the second one:

slope=($a$_tap_threshold−$a$_notap_threshold)/($t_3$−$t_2$)

Figure 4:
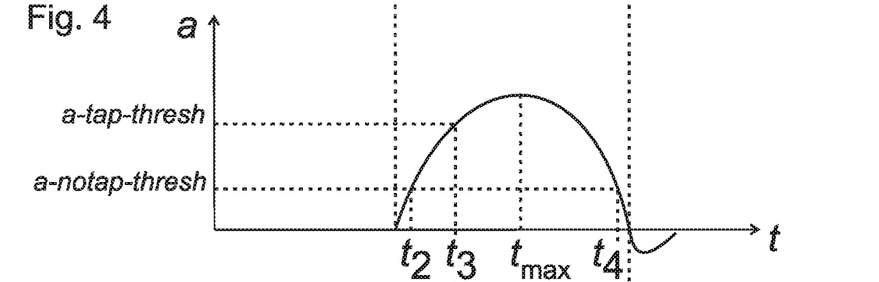
FIG. 4 is a chronogram which illustrates the acceleration measured by an accelerometer in a direction perpendicular to the glass of a touch panel during a tap gesture.

(see FIG. 4).

Those discriminating criteria can also be combined in different ways. For example, the processing means within the accelerometer could use the direction of the acceleration only during a limited time window, for example a less than 100 ms time interval starting at the beginning of the pulse.

It is also possible to consider at least one of those criteria separately during the raising portion of the acceleration signal and during the decreasing portion of this signal. For example, it is possibly to verify whether the duration, the frequency, and/or the slope of the acceleration signal during the raising portion, and then during the decreasing portion, are each in predefined ranges compatibles with the gesture one wants to discriminate.

Other discriminating criteria could be used if other gestures, such as double taps or long taps, are used as command to change the power mode.

In the embodiment of the invention illustrated on FIG. 2, the power on signal 230 generated by the inertial sensor 23 is used to wake up the touch panel 3b and/or the touch controller 24, or to switch those components from a low power mode to another power mode. Therefore, the touch panel 3b is switched off, or at least in low power mode, when the device 1 is in the first power mode, and is powered on, or at least partially powered on, after detection of a likely tap and generation of a wake up signal 230 by the accelerometer 23. In one embodiment, the wake up signal 230 generated by the inertial sensor 23 triggers a switch on command of the touch panel 3b and/or of the touch controller 24 from a low power mode in which nothing is displayed and no finger touch can be detected, to an intermediate power mode where only a subset of electrodes of the touch panel is activated, for example electrodes in the middle of the touch panel, in order detect finger contact such as taps or double taps in this limited area only and to avoid detection if a tap is made in a different area. In another embodiment, the wake up signal 230 triggers a switch on command of the touch controller 24 into a mode where all touch electrodes are activated, to detect a tap or double tap in any area of the touch panel 3b. It is also possible to activate the touch panel 3b and the touch controller 24 during only a limited duration, preferably less than 100 ms, after generation of the wake up signal 230.

The touch controller 24 generates a second wake up signal 240 to wake up the microcontroller 21, and possibly other components of the device 1, when this touch controller confirms the tap detection. The second wake up signal 240 can be input to an interrupt line or switch on line of the microcontroller 21. In one embodiment, the wake signal 230 of the inertial sensor 23 is generated very fast at the beginning of the tap, the touch controller 24 is immediately woken up, and used to confirm the finger detection on the touch sensor 3b during the remaining time of the tap. In another embodiment, a double tap is required, and the inertial sensor is used to detect the first tap while the touch sensor 3b, possibly in cooperation with the inertial sensor 23, is used for detecting the second confirmation tap. In yet another embodiment, a long tap is required, i.e. a tap where the finger rests against the glass during a minimal period. In all embodiments, a second wake up signal 240 is only generated if confirmation of a tap or double tap from the touch panel 3b occurs within a predetermined duration after the first wake signal, for example within a duration less than 300 ms, preferably less than 100 ms.

Discrimination of a tap by the touch controller 24 preferably depends on the location, size and duration of a touch signal generated by adjacent electrodes. A tap is usually made with the tip of a finger, i.e. on a small surface, during a short period, preferably on predetermined locations of the display.

The microcontroller 21 is only woken up by the second wake up signal of the touch controller 24. In another embodiment not illustrated hereby, the microcontroller is already woken up by the first wake up signal, and used for discriminating between tap and no tap based on signals from the touch controller 24; the second wake up signal is only used to confirm the first wake up signal and prevent the microcontroller 21 for reentering into the first power mode.

In one embodiment, a rough discrimination between a wake up gesture and no wake up gesture is made by the inertial sensor 23 and/or the touch sensor 3b, in order to wake up the microprocessor 21. The microprocessor then analyses the sequence of acceleration value delivered by the acceleration sensor, as well the signals delivered by the touch controller 24, to confirm or infirm the decision to wake up the device 1 and in particular the display and touch panel 3b. If the microprocessor confirms the tag detection, it remains in operating mode and wake up the display. On the other hand, if tap detection is not confirmed by the more advanced algorithms used by the microcontroller, the microcontrollers puts the touch panel 3b, touch controller 24 and itself back into the first power mode.

Figure 3:
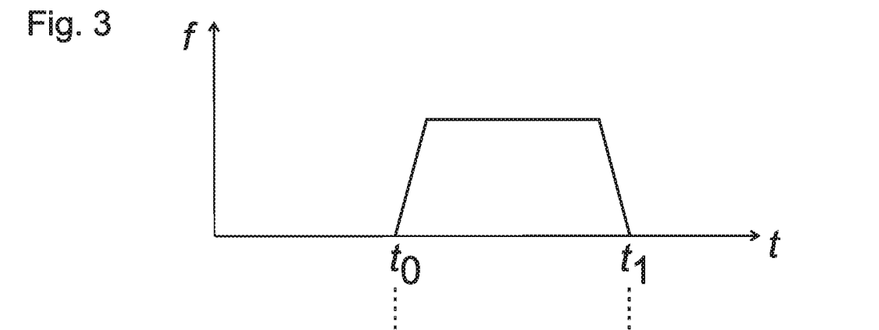
FIG. 3 is a chronogram which illustrates the force f applied to the glass of a touch panel during a tap gesture.

FIGS. 3 to 6 illustrate chronograms of various signals produced during a tap of the user on the glass of the wristwatch. FIG. 3 illustrates the force f applied by the finger on the glass during a tap between $t_0$ and $t_1$. The force increases very suddenly from $t_0$, remains approximately constant at a high level, and then decreases very quickly when the user releases the finger until he left the glass at $t_1$. The duration between $t_0$ and $t_1$ is typically comprised between 10 and 20 ms.

FIG. 4 illustrates the acceleration as measured by the accelerometer 23 in a direction perpendicular to the center of the touch panel 3b during the tap. The acceleration increases from time $t_0$ up to a maximum at $t_{max}$, and then decreases or even becomes negative until $t_1$. The acceleration might oscillate at low amplitude after the finger release. A tap is detected only if the amplitude of the measured acceleration reaches a first predefined threshold $a\_tap\_thresh$ at time $t_3$. End of the tap is detected at time $t_4$ when the amplitude decreases below a second threshold $a\_notap\_thresh$. A valid tap is discriminated based on the amplitude of the acceleration, duration between $t_3$ and $t_4$, frequency of the amplitude signal, and/or slope of the acceleration signal.

Figure 5:
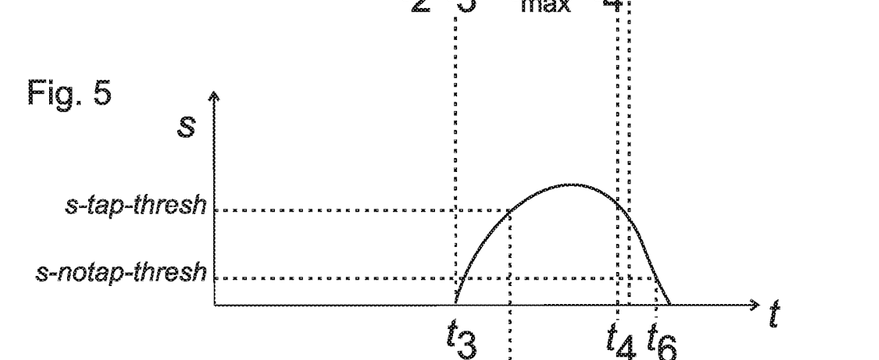
FIG. 5 is a chronogram which illustrates a signal measured by a touch sensor during a tap gesture.
Figure 6:
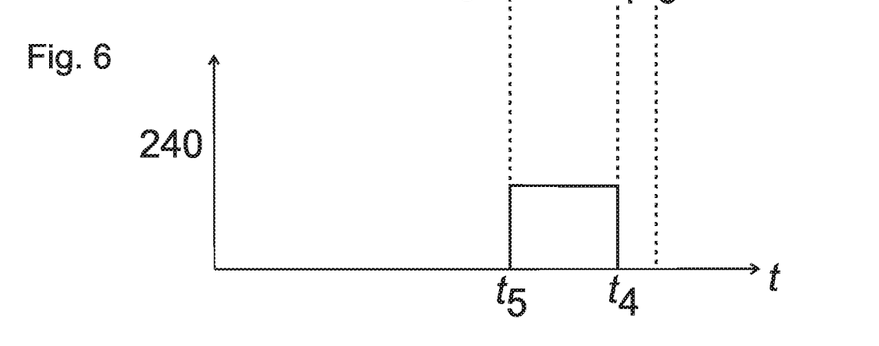
FIG. 6 is a signal which illustrates an example of power-on signal generated by a circuit according to the invention.

FIG. 5 illustrates a signal s produced by the touch controller 24 during a tap. This signal might be a combination between signals from different electrodes of the touch panel, or a signal processed from different signals of the electrodes. In one embodiment, the signal s is related to the probability of a tap, based on criteria like the size of the contact area, the frequency and timing of the contact signal, etc. The touch panel 3b and touch controller 24 are preferably in low power mode until time $t_3$ when the accelerometer 23 detects a tap and generates a first wake up signal 230. At time $t_5$, the signal s reaches a threshold $s\_{tap\_thresh}$ where the touch controller 24 detects a tap. End of the tap is detected at time $t_6$ when the signal s decreases below the threshold $s\_{notap\_thresh}$ FIG. 6 illustrates a second wake up signal 240 generated by the touch controller 24 or by a suitable circuit for switching the microcontroller 21 from a first low power mode to a second high power mode. The wake up signal is inactive until time $t_5$ when a tap is detected by the inertial sensor and confirmed by the touch sensor. The microcontroller 21, and preferably the display of the touch panel 3b, is preferably activated at the rising flank of the signal 240 at time $t_5$. This signal becomes inactive at time $t_4$ or $t_6$, at the end of the tap, although this does not result in changing the power mode of the device 1.

Figure 7A:
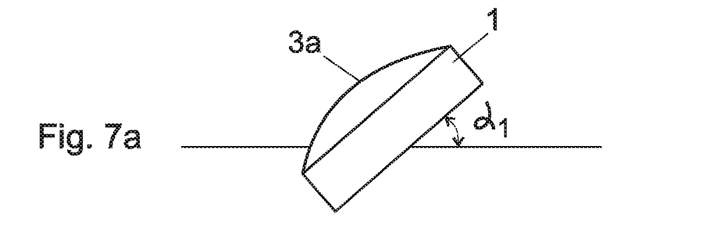
FIGS. 7a to 7c illustrate three successive positions of the wristwatch that are detected during a wristturn detection method.
Figure 7B:
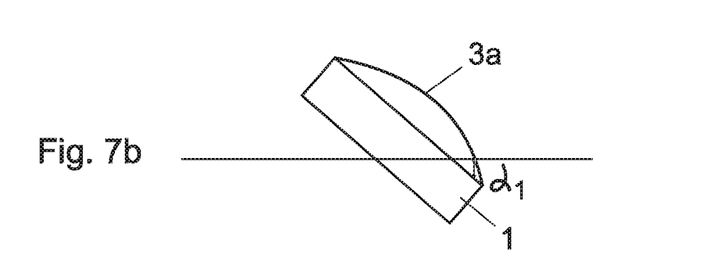
Figure 7C:
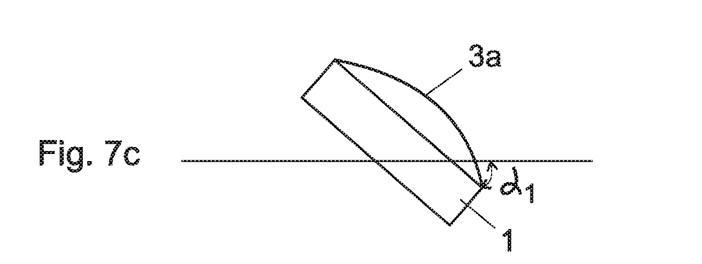

FIGS. 7a to 7c schematically illustrate three steps of another method for switching the wristwatch 1 from a first power mode to a second power mode. This method can be used in the same wristwatch than the above described method, so that a user can decide to wake his wristwatch either with the above described method (for example with a tap on the glass 3a) or with this other method of FIGS. 7a to 7c.

In this second method, a wristturn detection is performed for detecting rotation of the wrist and deciding if this rotation corresponds to predefined pattern, in which case the wristwatch should be switched to a second power mode for example in order to activate the display.

Initially, the microcontroller 21 is in a low power mode, for example completely off. The touch controller 24 to which the accelerometer 23 is connected, and which has the responsibility to wake up the microcontroller 21, is in a sleep mode (low power mode), but will wake up when an interrupt in the accelerometer 23 occurs. The accelerometer 23 is set so as to generate an interrupt when its position changes and reaches a given range that is maintained during a predetermined duration, as will be described.

The accelerometer 23 knows its position relatively to the vertical and horizontal direction. This can be determined for example by determining the direction along which the acceleration is substantially equal to 1 G when the accelerometer is substantially immobile during a predefined duration.

During a first step of the wristturn detection method, illustrated on FIG. 7a, the wristwatch reaches a starting position in a first defined angle range α1 (e.g. 25° to 155° relatively to the horizontal). This position must be held for a defined time (e.g. 50 ms) otherwise the start position is not registered. This position is identified using the accelerometer 23 internal orientation detection mechanism, for which the angle range can be set. The fact that a valid start position has been reached is then registered, for example in the accelerometer 23 or alternatively in the touch controller 24 which may be quickly woken to register that a valid start position is reached, before it goes back to wait for the next interrupt.

During a next step of the wristturn detection method, illustrated on FIG. 7b, the wristwatch has been rotated and reaches a final position in a second defined angle range α1 (e.g. −25° to −75° relatively to the horizontal). This position is a typical position for reading the time on the watch, with the display oriented toward the face of the user. This position must be held for a defined time (e.g. 50 ms) other the position is not registered. This position is identified using the accelerometer 23 internal orientation detection mechanism, for which the angle range can be set. When a final position in this range is reached, the system checks if a valid start position was registered during the previous step of FIG. 7a. If necessary, the touch controller 24 may be woken for this verification and/or for subsequent steps of the method.

The duration between the starting position and the final position may be measured. If this duration is not in a predefined range, the method is interrupted. Otherwise, the touch controller 24 changes to a No-movement & Angle Check mode. Alternatively, this No-movement & Angle Check detection may be performed by the embedded processing capabilities within the accelerometer 23.

On FIG. 7c, the system (for example the touch controller 24, or the accelerometer 23) verifies whether this final orientation of the wristwatch is maintained during a given duration. For this, the value of the acceleration along the three axes is periodically verified. If all 3 axis show no movement above a certain threshold for a defined time (respective defined number of samples), and if the orientation calculated from X/Y/Z is in a defined range (e.g. −25° to −60°), then the system determines that the user is probably consulting his watch. In this case, the touch controller 24 activates the microcontroller 21 and the display 3b, so the user can read the time.

Other methods of combining indications of the inertial sensor 23 and of the touch sensor 3b could be considered by the skilled person, including methods using additional wake up circuitry for discriminating between a tap gesture and no tap based on indication of the two sensors. The described example has the advantage that the number of components which need to be in an active power mode for discriminating a tap is very limited; in fact only the inertial sensor with integrated signal processing is required. In particular, no advanced signal processing capabilities are required in order to discriminate between a tap and other gestures or displacements of the watch with the accelerometer; the limited signal processing possibilities available in current mems-based accelerometers are sufficient.

Discrimination between a gesture and no gesture could be made within the processing means of the inertial sensor, by the touch controller 24, by the microcontroller 21, by a dedicated circuit (not shown), or by any combination thereof. Hardware and/or software modules could be used for this discrimination.

The invention claimed is:
1. A method for switching a wristwatch from a first power mode to a second power mode, comprising:
using an accelerometer for detecting a wristturn, and
switching said wristwatch from said first power mode to said second power mode when a wristturn has been detected,
wherein said step of detecting a wristturn comprises:
detecting that an orientation of the wristwatch is in a starting position, wherein said step of detecting that the orientation is in the starting position comprises detecting that the orientation of the wristwatch is held within a first range for a defined time;

detecting that an orientation of the wristwatch is then in a final position, wherein said step of detecting that the orientation is in the final position comprises detecting that the orientation is in a second range different from said first range, in response to a detection that the orientation of the wristwatch is in the second range, detecting that the wristwatch remains substantially immobile during a predetermined duration and that a duration between the starting position and the final position is in a predefined range.

2. The method of claim 1, wherein
said first range is an angle range from 25° to 155° relatively to the horizontal.

3. The method of claim 1, wherein
said second range is an angle range from −25° to −75° relatively to the horizontal.

4. The method of claim 1, wherein said step of detecting that the wristwatch remains substantially immobile during a predetermined duration comprises:

detecting that an orientation of the wristwatch is held in a range from −25° to −60° relatively to the horizontal during said predetermined duration.

5. The method of claim 1, wherein said defined time is 50 ms.

6. The method of claim 1, wherein comprising a step of
in response to a detection that the orientation of the wristwatch is held within this second range for a defined time, registering that an orientation of the wristwatch is in the final position; wherein said duration between the starting position and the final position is provided by measuring a duration between the starting position and the registering of the final position.

7. The method of claim 6, wherein said defined time is 50 ms.

8. The method of claim 1, wherein said step of detecting that the orientation of the wristwatch is in a second range comprises:

detecting that a duration between the wristwatch being held in the first range and the wristwatch being held in the second range is in a predefined third range.

9. The method of claim 1, wherein
said step of detecting that the orientation of the wristwatch is then in a second range comprises detecting that a display of the wristwatch is oriented towards a face of the user.

10. The method of claim 1, wherein said steps of detecting that the orientation of the wristwatch is in a first range and then in a second range comprise:

in response of a detection of the orientation of the wristwatch is in the second range, checking if the orientation of the wristwatch was in the first range during a previous step.

\* \* \* \* \*